(12) United States Patent
Yoon et al.

(10) Patent No.: US 9,041,994 B2
(45) Date of Patent: May 26, 2015

(54) DISPLAY APPARATUS INCLUDING A SHUTTER

(75) Inventors: Seon-Tae Yoon, Seoul (KR); Jae Byung Park, Seoul (KR); Hyun Min Cho, Hwaseong-si (KR); Dong-Hoon Lee, Hwaseong-si (KR); Mun-Ki Sim, Cheongju-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 422 days.

(21) Appl. No.: 13/407,539

(22) Filed: Feb. 28, 2012

(65) Prior Publication Data

US 2012/0250132 A1    Oct. 4, 2012

(30) Foreign Application Priority Data

Apr. 1, 2011  (KR) .................. 10-2011-0030398

(51) Int. Cl.
*G02B 26/02*    (2006.01)
*G09G 3/34*    (2006.01)

(52) U.S. Cl.
CPC .............. *G02B 26/02* (2013.01); *G09G 3/3433* (2013.01); *G09G 2300/0842* (2013.01)

(58) Field of Classification Search
CPC .... G02B 26/02; G02B 26/04; G02B 26/0841; G09G 2300/0842; G09G 3/34; G09G 3/3433; G03B 27/522
USPC ................................................ 359/230, 233
See application file for complete search history.

(56) References Cited

U.S. PATENT DOCUMENTS

| | | | |
|---|---|---|---|
| 7,304,786 B2 | 12/2007 | Hagood et al. | |
| 2007/0182707 A1 | 8/2007 | Kothari | |
| 2008/0129681 A1 | 6/2008 | Hagood et al. | |
| 2010/0123947 A1 | 5/2010 | Cho et al. | |
| 2011/0043882 A1* | 2/2011 | Yoon et al. | 359/230 |
| 2012/0153309 A1* | 6/2012 | Kim et al. | 257/88 |
| 2012/0236385 A1* | 9/2012 | Yun et al. | 359/230 |

FOREIGN PATENT DOCUMENTS

KR    1020070114161    11/2007

* cited by examiner

*Primary Examiner* — James Phan
(74) *Attorney, Agent, or Firm* — Innovation Counsel LLP (57) ABSTRACT

A display apparatus includes a first substrate, a second substrate facing the first substrate, and a plurality of pixels including a first pixel. The first substrate includes first openings through which a light is transmitted. The pixels are disposed on at least one of the first substrate and the second substrate. The first pixel includes a first flexible electrode, a second flexible electrode, and a shutter including second openings and disposed between the first and second flexible electrodes. The first flexible electrode receives a first voltage. The second flexible electrode receives a second voltage different from the first voltage. The shutter receives a third voltage. The shutter moves to the first flexible electrode or the second flexible electrode according to a level of the third voltage, thereby controlling the position of the second openings relative to the first openings to control the transmission of the light.

20 Claims, 11 Drawing Sheets

DISPLAY APPARATUS INCLUDING A SHUTTER

CROSS-REFERENCE TO RELATED APPLICATION

This application relies for priority upon Korean Patent Application No. 10-2011-0030398 filed on Apr. 1, 2011, the contents of which are herein incorporated by reference in its entirety.

BACKGROUND

1. Field of Disclosure

The present invention relates to a display apparatus. More particularly, the present invention relates to a display apparatus having a micro-shutter capable of improving display quality.

2. Description of the Related Art

Recently, micro-shutter display apparatus employing a micro-shutter is receiving much attention in the field of microelectromechanical systems. A micro-shutter may be deformed by electrostatic force caused by an electric field. A micro-shutter display apparatus transmits or blocks light using the deformation property of the micro-shutter. However, since the micro-shutter display apparatus displays an image using mechanical components integrated on a substrate, image quality depends on the integration technology for the mechanical components.

SUMMARY

One or more embodiments of the present invention provide a display apparatus having a micro-shutter capable of improving display quality.

The display apparatus includes a first substrate, a second substrate, and a plurality of pixels.

The first substrate includes a first plurality of openings through which light is transmitted. The second substrate faces the first substrate. The plurality of pixels is disposed on at least one of the first substrate and the second substrate. The plurality of pixels includes at least a first pixel.

The first pixel includes a first flexible electrode, a second flexible electrode facing the first flexible electrode, and a shutter including a second plurality of openings and disposed between the first and second flexible electrodes, wherein the second plurality of openings corresponds to the first plurality of openings. The first flexible electrode receives a first voltage. The second flexible electrode receives a second voltage different from the first voltage. The shutter receives a third voltage.

The shutter moves toward the first flexible electrode or the second flexible electrode according to a level of the third voltage, thereby controlling the position of the second plurality of openings relative to the first plurality of openings to control the transmission of the light.

According to one or more embodiments of the invention, the movement of the shutter is confined by the first and second flexible electrodes disposed at both sides of the shutter and is controlled according to the voltages applied to the shutter, the first flexible electrode, and or the second flexible electrode; therefore, the movement and/or the position of the shutter can be precisely controlled. In addition, the circuit configuration of the display apparatus may be simplified, to reduce the manufacturing cost of the display apparatus, to enhance an aperture ratio of the display apparatus, and/or to reduce power consumption of the display apparatus.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION

It will be understood that when an element or layer is referred to as being "on", "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" may include any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" may include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 1:
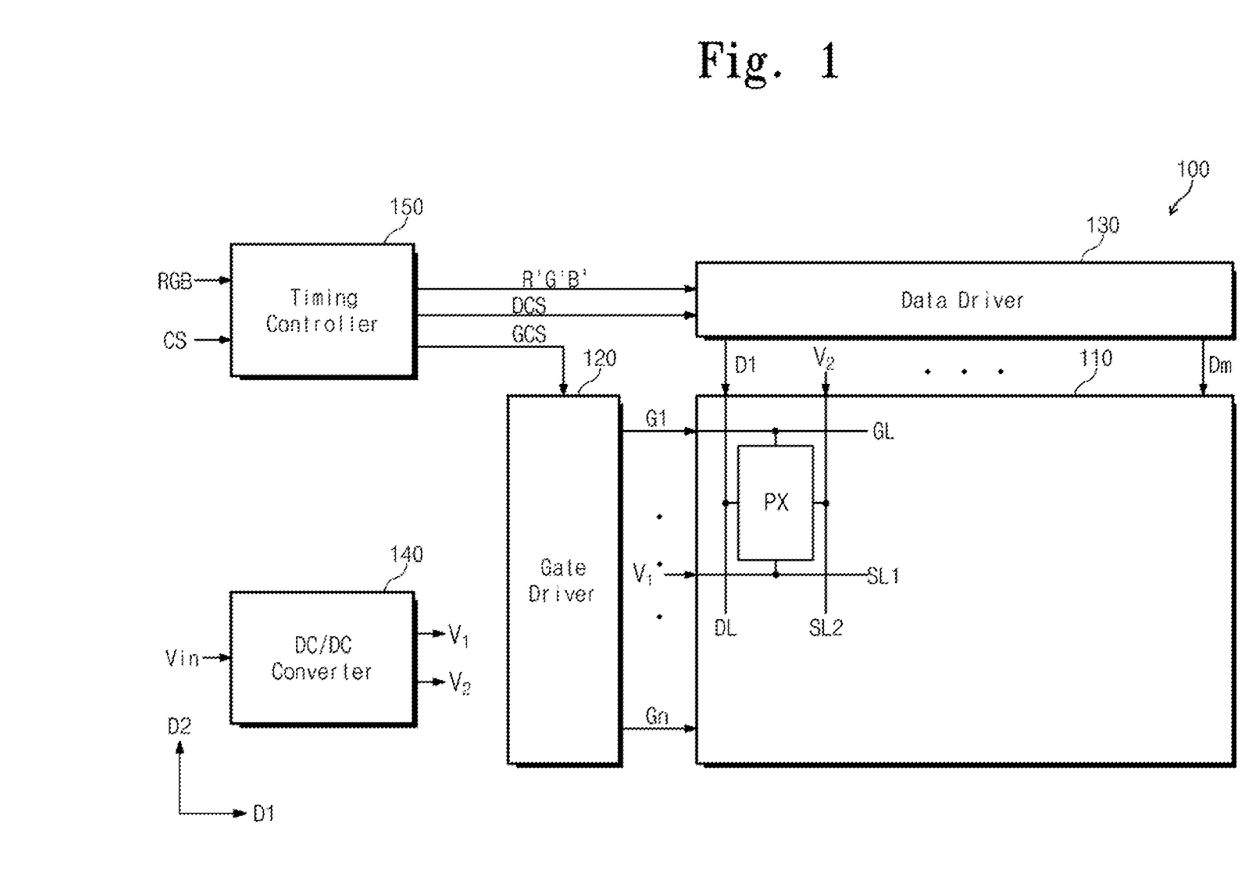
FIG. 1 is a block diagram illustrating a display apparatus according to an embodiment of the present invention.

FIG. 1 is a block diagram illustrating a display apparatus according to an embodiment of the present invention.

Referring to FIG. 1, a display apparatus 100 includes a display panel 110, a gate driver 120, a data driver 130, a DC-DC converter 140, and a timing controller 150.

The timing controller 150 receives image signals RGB and a control signal CS from an external source. The timing controller 150 converts a data format of the image signals RGB into a data format appropriate to an interface between the timing controller 150 and the data driver 130 and applies the converted image signals R'G'B' to the data driver 130. In addition, the timing controller 150 applies at least a data control signal DCS, such as a vertical synchronization signal V_sync, an output start signal, a horizontal start signal, etc., to the data driver 130.

The timing controller 150 applies a gate control signal GCS, such as a vertical start signal, a vertical clock signal, a vertical clock bar signal, etc., to the gate driver 120.

The data driver 130 converts the image signals R'G'B' into data voltages D1 to Dm in response to the data control signal DCS from the timing controller 150, and the data voltages D1 to Dm are applied to the display panel 110.

The display panel 110 includes a plurality of gate lines GL1 to GLn extending in a first direction D1, a plurality of data lines DL1 to DLm extending in a second direction D2 different from the first direction D1 to cross the gate lines GL1 to GLn, and a plurality of pixels PX each of which is connected to a corresponding gate line of the gate lines GL1 to GLn and a corresponding data line of the data lines DL1 to DLm.

In addition, the display panel 110 includes a plurality of first signal line spaced apart from the gate lines GL1 to GLn and extended in the first direction D1 and a plurality of second signal line spaced apart from the data lines DL1 to DLm and extended in the second direction D2. FIG. 1 illustrates one first signal line SL1 and one second signal line SL2, which are arranged in one pixel area. Each pixel PX is connected to a corresponding first signal line of the first signal lines and a corresponding second signal line of the second signal lines.

The gate lines GL1 to GLn are connected to the gate driver 120, and the data lines DL1 to DLm are connected to the data driver 130. The gate lines GL1 to GLn receive gate signals G1 to Gn provided from the gate driver 120, and the data lines DL1 to DLm receive the data voltages D1 to Dm provided from the data driver 130.

The DC-DC converter 140 receives an input voltage Vin from an external device and applies a first voltage V1 to the first signal line SL1 and a second voltage V2 to the second signal line V2. In FIG. 1, the first and second voltages V1 and V2 are provided from the DC-DC converter 140, but it should not be limited thereto or thereby. In one or more embodiments, the first and second voltages V1 and V2 may be provided from the data driver 130.

Although not shown in FIG. 1, the display apparatus 100 may further include a backlight unit disposed adjacent to the display panel 110 to provide light to the display panel 110.

Figure 2:
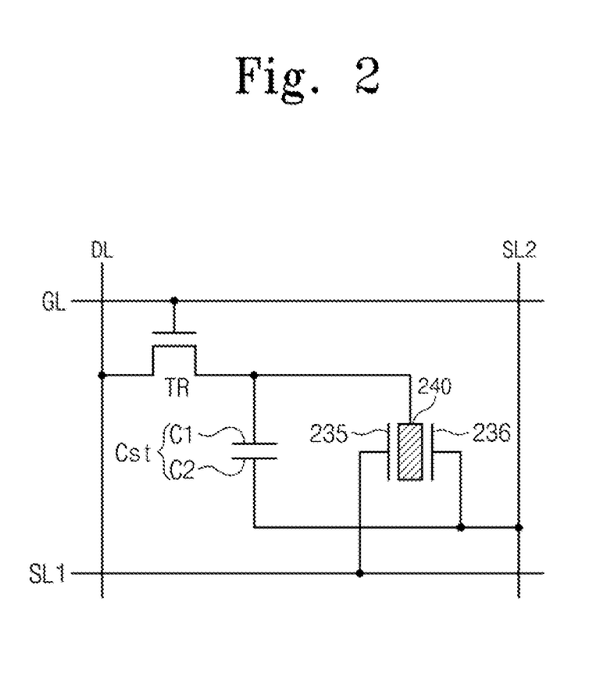
FIG. 2 is a circuit diagram illustrating a pixel shown in FIG. 1 according to an embodiment of the present invention.
Figure 3:
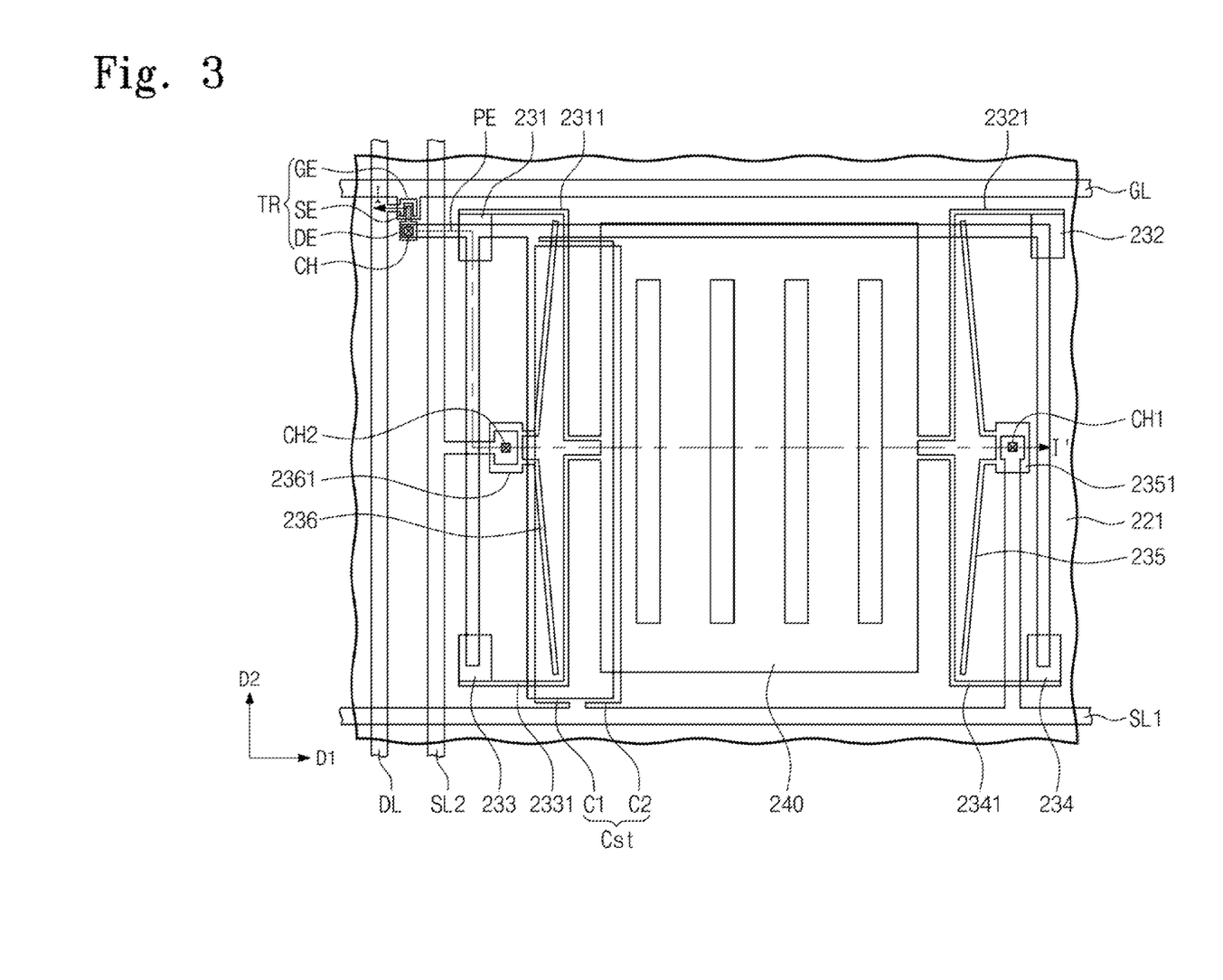
FIG. 3 is a plan view showing the pixel illustrated in FIG. 2 according to an embodiment of the present invention.

FIG. 2 is a circuit diagram illustrating a pixel illustrated in FIG. 1 according to an embodiment of the present invention, and FIG. 3 is a plan view illustrating the pixel illustrated in FIG. 2 according to an embodiment of the present invention.

Referring to FIGS. 2 and 3, the pixel PX includes a switching device TR, a shutter 240, a first flexible electrode 235, a second flexible electrode 236, and a storage capacitor Cst.

The switching device TR includes a first electrode GE connected to the gate line GL, a second electrode SE connected to the data line DL, and a third electrode DE connected to the shutter 240. The switching device TR may be a thin film transistor formed on the display panel 110 by a thin film process. The switching device TR is turned on in response to the gate signal provided through the gate line GL. The data voltage applied to the data line DL is input to the second electrode SE of the turned-on switching device TR and output from the third electrode DE of the turned-on switching device TR.

The shutter 240 includes a plurality of openings and is electrically connected to the third electrode DE of the switching device TR to receive the data voltage applied to the data line DL.

The first flexible electrode 235 is connected to the first signal line SL1 to receive the first voltage V1. The second flexible electrode 236 is connected to the second signal SL2 to receive the second voltage V2. The first and second flexible electrodes 235 and 236 face each other with the shutter 240 being interposed therebetween.

In one or more embodiments, although not shown in FIG. 2, when the data voltage applied to the shutter 240 is close to or equal to the first voltage V1, the shutter 240 moves toward the second flexible electrode 236 according to a difference in electric potential between the first and second flexible electrodes 235 and 236. When the data voltage applied to the shutter 240 is close to or equal to the second voltage V2, the shutter 240 moves toward the first flexible electrode 235 according to the difference in electric potential between the first and second flexible electrodes 235 and 236.

For instance, the first voltage V1 may be substantially zero volts and the second voltage V2 may be about 20 volts. In detail, when the shutter 240 is applied with the voltage of about 20 volts while the voltage of about zero volts is applied to the first flexible electrode 235 and the voltage of about 20 volts is applied to the second flexible electrode 236, the shutter 240 moves to the first flexible electrode 235 such that the shutter 240 may be precisely positioned by the first flexible electrode 235, and when the shutter 240 is applied with the voltage of zero volts or applied with no voltage, the shutter 240 moves to the second flexible electrode 236 such that the shutter 240 may be precisely positioned by the second flexible electrode 236.

The storage capacitor Cst includes a first capacitor electrode C1 extending from the third electrode DE of the switching device TR and a second capacitor electrode C2 extending from the first signal line SL1 to face the first capacitor electrode C1. The storage capacitor Cst receives the voltage from the data line DL when the switching device TR is turned on to maintain the voltage from the data line DL when the switching device TR is turned off.

Referring to FIG. 3, the pixel PX further includes a pixel electrode PE connected to the third electrode DE of the switching device TR through the contact hole CH. In addition, the pixel PX further includes a first supporter 231, a second supporter 232, a third supporter 233, and a fourth supporter 234, which are connected to the pixel electrode PE to support the shutter 240. The pixel electrode PE extends in the first and second directions D1 and D2 to be connected to the first to fourth supporter 231, 232, 233, and 234 that support the shutter 240.

The shutter 240 includes a first flexible supporter 2311 connected to the first supporter 231, a second flexible supporter 2321 connected to the second supporter 232, a third flexible supporter 2331 connected to the third supporter 233, and a fourth flexible supporter 2341 connected to the fourth supporter 234. The first to fourth flexible supporters 2311, 2321, 2331, and 2341 connect the first to fourth supporter 231, 232, 233, and 234 to the shutter 240 to allow the shutter 240 to be floated. In addition, the first to fourth flexible supporters 2311, 2321, 2331, and 2341 allow the shutter 240 to move toward the first flexible electrode 235 or toward the second flexible electrode 236 when a voltage is applied to the shutter 240.

The pixel PX includes a first flexible electrode supporter 2351 connected to the first signal line SL1 through the first contact hole CH1, wherein the first flexible electrode 235 extends from the first flexible electrode supporter 2351. The pixel PX further includes a second flexible electrode supporter 2361 extending from the second signal line SL2 through the second contact hole CH2, wherein the second flexible electrode 236 extends from the second flexible electrode supporter 2361. The first flexible electrode supporter 2351 supports the first flexible electrode 235 such that the first flexible electrode 235 faces the second and fourth flexible supporters 2321 and 2341. The second flexible electrode supporter 2361 supports the second flexible electrode 236 such that the second flexible electrode 236 faces the first and third flexible supporters 2311 and 2331.

The pixel PX may further include the first capacitor electrode C1 extending from the pixel electrode PE and the second capacitor electrode C2 extending from the first signal line SL1. The first and second capacitor electrodes C1 and C2 faces each other while a dielectric layer is interposed therebetween to form the storage capacitor Cst.

Figure 4:
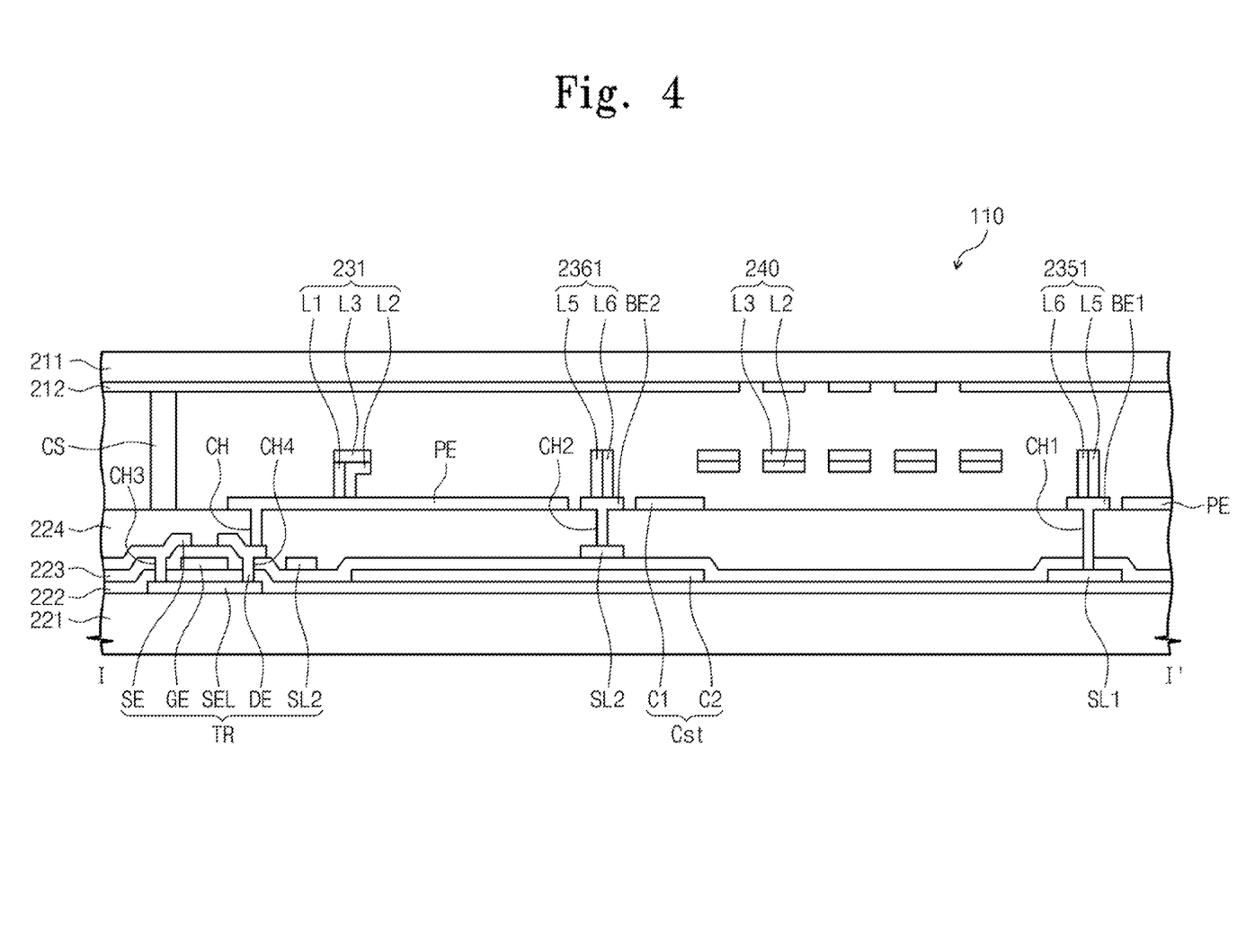
FIG. 4 is a cross-sectional view taken along line I-I' of FIG. 3 according to an embodiment of the present invention.

FIG. 4 is a cross-sectional view taken along line I-I' of FIG. 3 according to an embodiment of the present invention.

The display panel 110 includes a first base substrate 211, a light blocking layer 212 disposed on the first base substrate 211, a second base substrate 221 facing the first base substrate 211, and the switching device TR disposed on the second base substrate 221.

The first base substrate 211 is a substrate formed of a transparent material, such as plastic, glass, etc., to transmit the light. The light blocking layer 212 is disposed on the first base substrate 211 to block or absorb the light and transmits the light through a plurality of openings formed through the light blocking layer 212.

The second base substrate 221 is a substrate formed of a transparent material, such as plastic, glass, etc., to transmit light. The switching transistor TR includes the first electrode GE (a gate electrode) connected to the gate line GL, the second electrode SE (a source electrode) connected to the data line DL, the third electrode DE (a drain electrode) connected to the pixel electrode PE, and a semiconductor layer SEL disposed under the first, second, and third electrodes GE, SE, and DE.

The semiconductor layer SEL is disposed on the second base substrate 221, and a first gate insulating layer 222 is disposed on the semiconductor layer SEL. The first electrode GE of the switching device TR is disposed on the first gate insulating layer 222 and the semiconductor layer SEL, and the first signal line SL1 and the second capacitor electrode C2 are disposed on the first gate insulating layer 222 and are spaced apart from the first electrode GE of the switching device TR. A second gate insulating layer 223 is disposed on the first electrode GE of the switching device TR, the first signal line SL1, and the second capacitor electrode C2. The second and third electrodes SE and DE of the switching device TR are disposed on the second gate insulating layer 223. The second electrode SE of the switching device TR is connected to the semiconductor layer SEL through the third contact hole CH3, and the third electrode DE of the switching device TR is connected to the semiconductor layer SEL through the fourth contact hole CH4.

The second signal line SL2 is further disposed on the second insulating layer 223 and are spaced apart from the second and third electrodes SE and DE of the switching device TR. A protecting layer 224 is disposed on the second and third electrodes SE and DE of the switching device TR and the second signal line SL2. The protecting layer 224 protects the switching device TR and compensates for a step-difference between layers thereunder. The protecting layer 224 may be thicker than one or more of the other members and may include an organic material.

The pixel electrode PE, a first flexible electrode connecting portion BE1, and a second flexible electrode connecting portion BE2 are disposed on the protecting layer 224. The first and second flexible electrode connecting portions BE1 and BE2 may be formed of the same material as the pixel electrode PE. The first flexible electrode connecting portion BE1 electrically connects the first signal line SL1 and the first flexible electrode 235 through the first contact hole CH1. The second flexible electrode connecting portion BE2 electrically connects the second signal line SL2 and the second flexible electrode 236 through the second contact hole CH2.

The first flexible electrode supporter 2351 is disposed on the first flexible electrode connecting portion BE1 to electrically connect the first flexible electrode connecting portion BE1 and the first flexible electrode 235, and to mechanically support the first flexible electrode 235. The second flexible electrode supporter 2361 is disposed on the second flexible electrode connecting portion BE2 to electrically connect the second flexible electrode connecting portion BE2 and the second flexible electrode 236, and to mechanically support the second flexible electrode 236. The first flexible electrode supporter 2351 includes a light absorbing layer L5 making contact with the first flexible electrode connecting portion BE1, the light absorbing layer L5 extending toward the first flexible electrode 235. The first flexible electrode supporter 2351 further includes a conductive layer L6 making contact with the first flexible connecting portion BE1 and the light absorbing layer L5, the conductive layer L6 also extending toward the first flexible electrode 235. The second flexible electrode supporter 2361 includes a light absorbing layer L5 making contact with the second flexible electrode connecting portion BE2, the light absorbing layer L5 extending toward the second flexible electrode 236. The second flexible electrode supporter 2361 further includes a conductive layer L6 making contact with the second flexible connecting portion BE2 and the light absorbing layer L5, the conductive layer L6 also extending toward the second flexible electrode 236. The first capacitor electrode C1 is disposed on the protecting layer 224 and forms the storage capacitor Cst in cooperation with the second capacitor C2. In this case, the protecting layer 224 and the second gate insulating layer 223 disposed between the first and second capacitor electrodes C1 and C2 serve as the dielectric layer of the storage capacitor Cst.

A column spacer CS is disposed between the first and second base substrates 211 and 221 to maintain a distance between the first and second base substrates 211 and 221.

The first supporter 231 is disposed on the pixel electrode PE to support the shutter 240. The shutter 240 has a double-layer structure including a light absorbing layer L3 and a semiconductor layer L2. The first supporter 231 includes a conductive layer L1 making contact with the pixel electrode PE and extending toward the shutter 240, a semiconductor layer L2 making contact with the pixel electrode PE and the conductive layer L1 and extending from (and/or connecting to) the semiconductor layer L2 of the shutter 240, and a light absorbing layer L3 disposed on the conductive layer L1 and the semiconductor layer L2 and extending from (and/or connecting to) the light absorbing layer L3 of the shutter 240. The semiconductor layer L2 prevents light from being reflected at an upper surface of the shutter 240 toward outside of the display apparatus 100.

Although not shown in FIG. 4, each of the second, third, and third supporters 232, 233, and 234 has the same structure as that of the first supporter 231 or has a structure analogous to that of the first supporter 231.

In FIG. 4, the conductive layer L1 may include a metal material such as aluminum. The semiconductor layer L2 may include a silicon material such as amorphous silicon. The light absorbing layer L3 may include a material that absorbs the light, such as chromium oxide.

The shutter 240 is provided with a plurality of openings corresponding to the openings formed through the light blocking layer 212, respectively. In detail, when the openings of the shutter 240 are placed at positions aligned with the openings of the light blocking layer 212, the light provided from the exterior transmits through the shutter 240 and the light blocking layer 212. On the other hand, when the openings of the shutter 240 are placed at positions not aligned with the openings of the light blocking layer 212, the light provided from the exterior may be substantially or completely blocked, and may not be transmitted through the shutter 240 and the light blocking layer 212. The light absorbing layer L3 (disposed between the light blocking layer 212 and the semiconductor layer L2) may reduce light-leakage when the openings of the shutter 240 are placed at positions not aligned with the openings of the light blocking layer 212.

Figure 5:
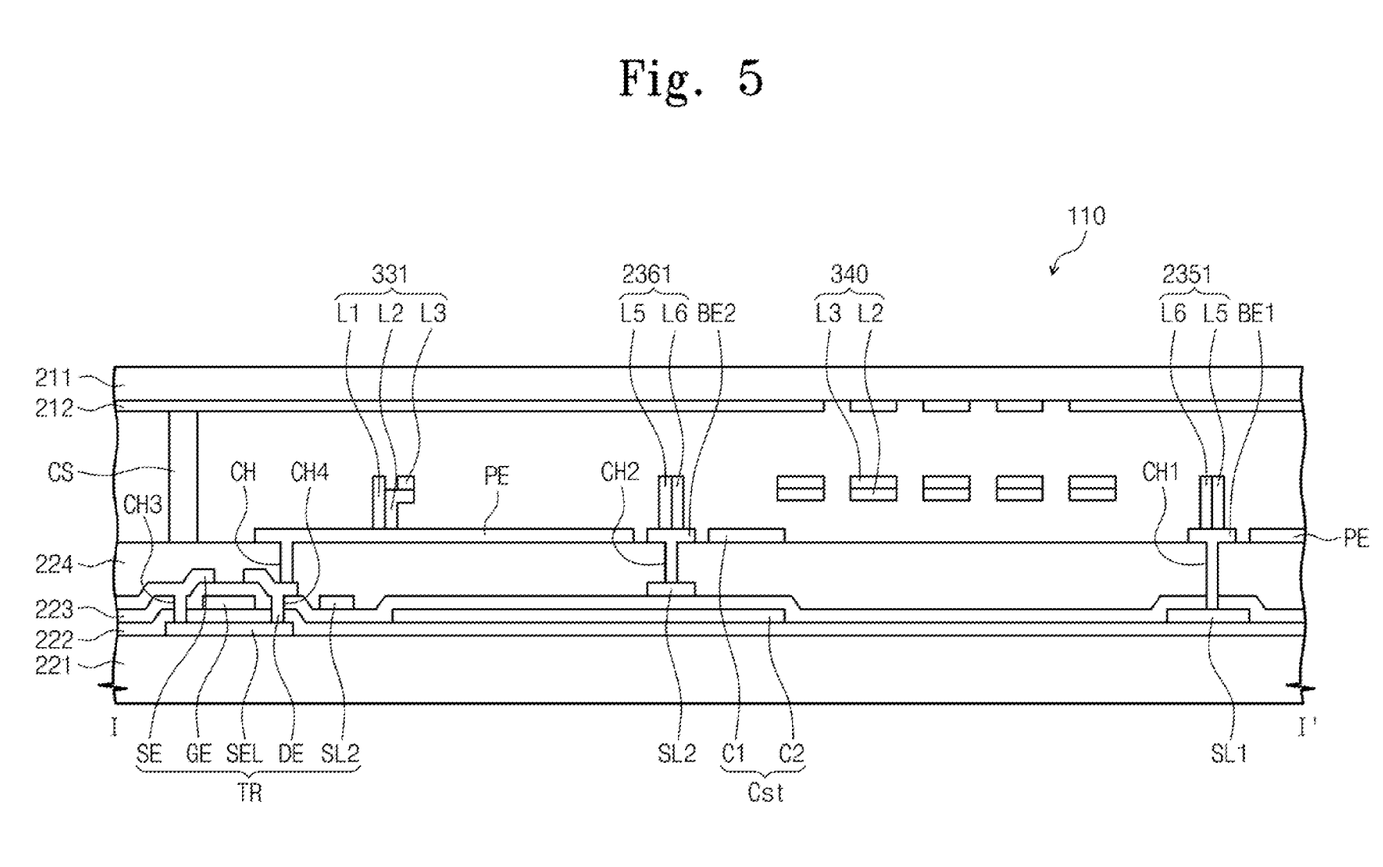
FIG. 5 is a cross-sectional view taken along line I-I' of FIG. 3 according to another embodiment of the present invention.

FIG. 5 is a cross-sectional view taken along line I-I' of FIG. 3 according to an embodiment of the present invention. In FIG. 5, the same reference numerals denote the same elements in FIG. 4, and thus detailed descriptions of the same elements will be omitted. One or more elements in the example of FIG. 5 may be replaced with one or more elements in the example of FIG. 4, and vice versa.

Referring to FIG. 5, a shutter 340 has a double-layer structure of a conductive layer L3 and a semiconductor layer L2. A first supporter 331 includes a semiconductor layer L2 making contact with the pixel electrode PE and extending from (or connecting to) the semiconductor layer L2 of the shutter 340. The first supporter 331 further includes a conductive layer L1 making contact with the pixel electrode PE, being spaced apart from the conductive layer L3 of the shutter 340, and extending substantially perpendicular to the pixel electrode PE. As described above, the conductive layer L1 of the shutter 340 is spaced apart from the conductive layer L3 of the first supporter 331, thereby preventing electric charges from accumulating on the conductive layer L3 of the shutter 340.

In FIG. 5, the conductive layer L3 and/or the conductive layer L1 may include a metal material such as aluminum. The semiconductor layer L2 may include a silicon material such as amorphous silicon. Although not shown in FIG. 5, each of the second and third supporters may have a structure analogous to that of the first supporter 331.

Figure 6A:
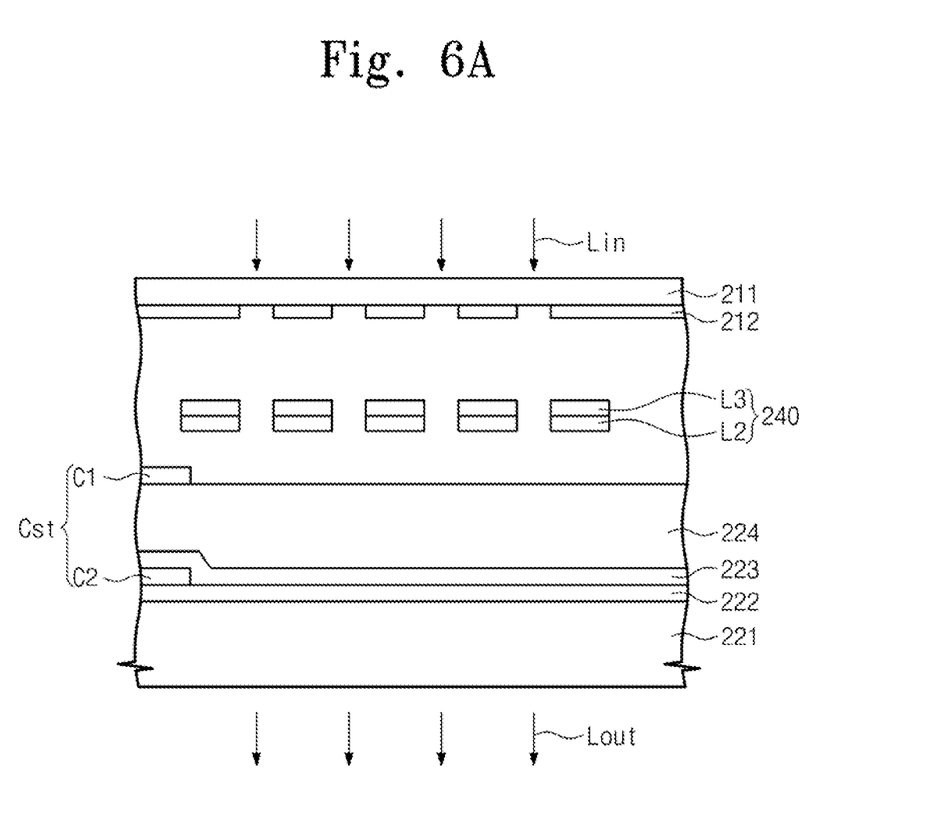
FIGS. 6A and 6B are sectional views illustrating a method of driving the display apparatus illustrated in FIGS. 3 and 4.
Figure 6B:
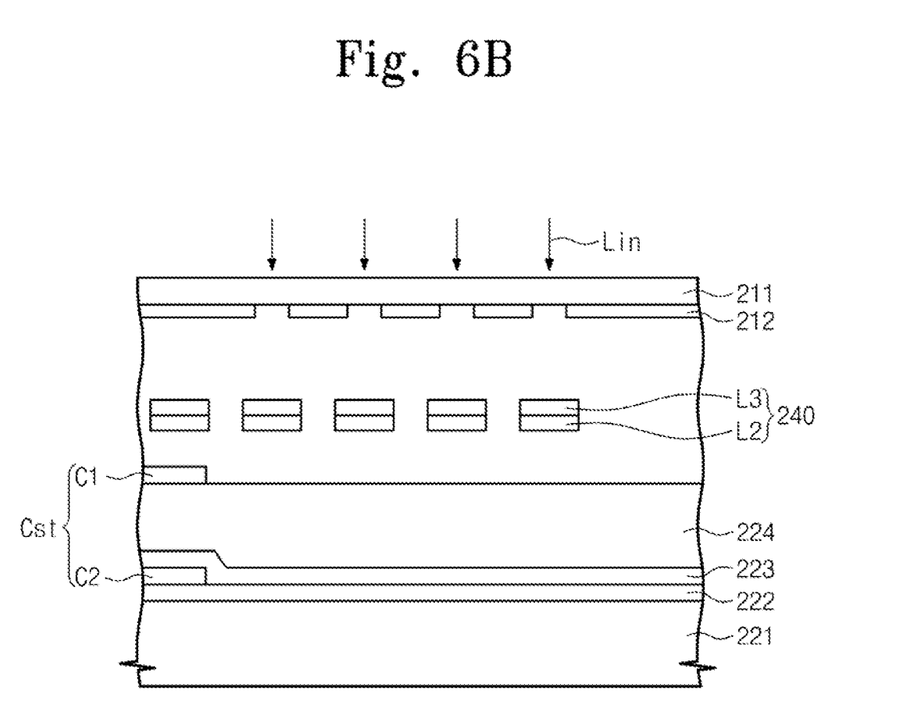

FIGS. 6A and 6B are sectional views illustrating a method of driving the display apparatus illustrated in FIGS. 3 and 4. For convenience of explanation, FIGS. 6A and 6B illustrate a portion of the display apparatus illustrated in FIG. 4.

Referring to FIGS. 4 and 6, when the voltage output from the third electrode DE of the switching device TR and applied to the shutter 240 through the pixel electrode PE is substantially equal to the second voltage V2 applied to the second flexible electrode 236, the shutter 240 moves to the first flexible electrode 235 (to which the first voltage V1 is applied), and the openings of the shutter 240 are placed at positions aligned with the openings of the light blocking layer 212 in the direction substantially perpendicular to the light blocking layer 212. Thus, the light Lin transmitted through the light blocking layer 212 from a light source (not shown) disposed above the first base substrate 211 is transmitted through the shutter 240, and the light Lout exits from the second base substrate 221. As an example, the first voltage V1 may be substantially zero volts and the second voltage V2 may be about 20 volts.

Referring to FIGS. 4 and 6B, when the voltage output from the third electrode DE of the switching device TR is substantially equal to the first voltage V1 applied to the first flexible electrode 235 or when the switching device TR is turned off, the shutter 240 moves to the second flexible electrode 236, and the openings of the shutter 240 are placed at positions not aligned with the openings of the light blocking layer 212 in the direction substantially perpendicular to the light blocking layer 212. Accordingly, the light Lin incident through the light blocking layer 212 from the light source (not shown) disposed above the first base substrate 211 is not transmitted through the shutter 240, and no light exits from the second base substrate 221. Thus, the desired gray scales can be obtained.

In the examples of FIGS. 6A and 6B, a voltage substantially equal to the first voltage V1 applied to the first flexible electrode 235 or a voltage substantially equal to the second voltage V2 applied to the second flexible electrode 236 is applied to the shutter 240, but the voltage applied to the shutter 240 may be substantially different from the first and second voltages V1 and V2, for tuning the position of the shutter 240. In addition, in the examples, the light is blocked when a voltage substantially equal to the first voltage V1 is applied to the shutter 240, but the arrangements of light blocking and transmission should not be limited thereto. In one or more embodiments, the light may be blocked when a voltage substantially equal to the second voltage V2 is applied to the shutter 240.

Figure 7:
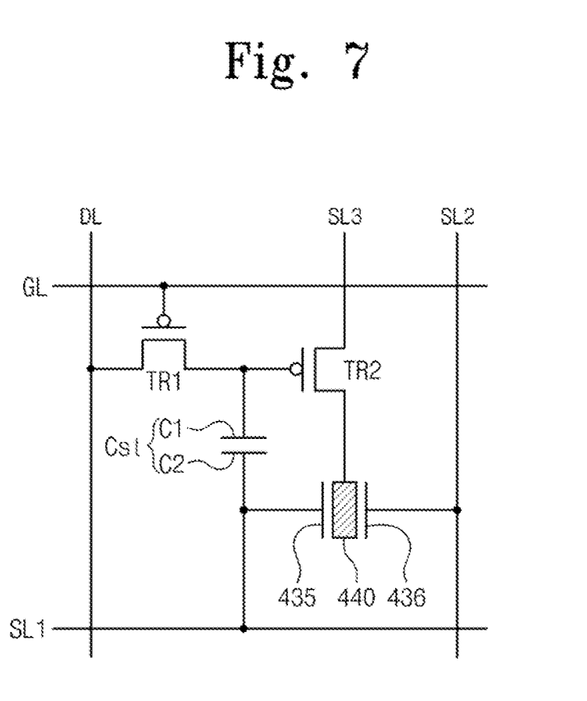
FIG. 7 is a circuit diagram illustrating a pixel illustrated in FIG. 1 according to an embodiment of the present invention.
Figure 8:
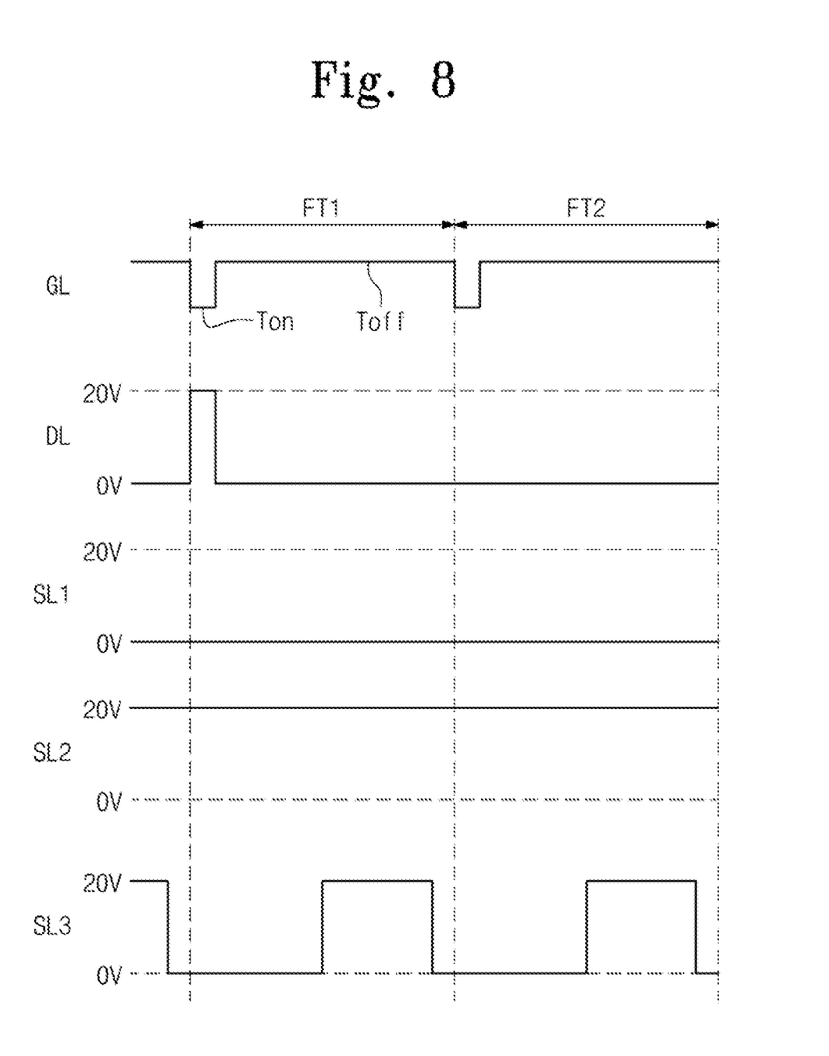
FIG. 8 is a timing diagram illustrating a method of driving the pixel illustrated in FIG. 7.

FIG. 7 is a circuit diagram illustrating a pixel illustrated in FIG. 1 according to an embodiment of the present invention, and FIG. 8 is a timing diagram illustrating a method of driving the pixel illustrated in FIG. 7.

Referring to FIG. 7, the pixel includes a first switching device TR1, a second switching device TR2, a shutter 440, a first flexible electrode 435, a second flexible electrode 436, and a storage capacitor Cst.

In addition, the pixel further includes a third signal line SL3 connected to the second switching device TR2.

The first switching device TR1 includes a first electrode connected to the gate line GL, a second electrode connected to the data line DL, a third electrode connected to the second switching device TR2. The first switching device TR1 is turned on in response to a gate signal applied to the gate line GL, and the data voltage applied to the data line DL is output from the third electrode of the turned-on first switching device TR1 through the second electrode of the turned-on first switching device TR1.

The second switching device TR2 includes a first electrode connected to the third electrode of the first switching device TR1, a second electrode connected to the third signal line SL3, a third electrode connected to the shutter 440.

The first flexible electrode 435 is connected to the first signal line SL1 to receive the first voltage. The second flexible electrode 436 is connected to the second signal line SL2 to receive the second voltage. The first and second flexible electrodes 435 and 436 face each other while the shutter 440 is interposed therebetween.

The storage capacitor Cst includes a first capacitor electrode C1 extending from the third electrode of the first switching device TR1 and a second capacitor electrode C2 extending from the first signal line SL1 to face the first capacitor electrode C1. The pixel shown in FIG. 7 will be described with reference to FIG. 8 on the assumptions that the first voltage is about zero volts and that the second voltage is about 20 volts.

Referring to FIG. 8, when a turn-on signal Ton is applied to the first electrode of the first switching device TR1 during a first frame FT1, the data voltage of about 20 volts is applied to the second electrode of the first switching device TR1. The voltage of about 20 volts provided through the first switching device TR1 is charged in the storage capacitor Cst. Then, when the voltage input through the third signal line SL3 is changed from a voltage substantially equal to the first voltage (i.e., zero volts) that turns off the second switching device TR2 to a voltage substantially equal to the second voltage (i.e., 20 volts) that turns on the second switching device TR2, a voltage of about 20 volts is applied to the shutter 440 through the second switching device TR2. In this case, since the voltage of about 20 volts is applied to the shutter 440, the shutter 440 moves to the first flexible electrode 435. Thus, the pixel may display a white gray scale or a black gray scale in the first frame FT1. However, the voltage applied to the third signal line SL3 is changed again to zero volts before a second frame FT2 starts, so that zero volts is applied to the shutter 440.

When the turn-on signal Ton is applied to the first electrode of the first switching device TR1 in the second frame FT2, the data voltage of zero volts is applied to the second electrode of the first switching device TR1. The voltage input through the first switching device TR1 is charged in the storage capacitor Cst. Then, although the voltage input through the third signal line SL3 is changed from a voltage substantially equal to the first voltage (i.e., zero volts) that turns off the second switching device TR2 to a voltage substantially equal to the second voltage (i.e., 20 volts) that turns on the second switching device TR2, the zero volts applied to the shutter 440 may be maintained since the second transistor TR2 is turned off. Accordingly, the shutter 440 moves to the second flexible electrode 436 during the second frame FT2, and thus the pixel may display the white gray scale or the black gray scale during the second frame FT2. Given that the shutter 440 is positioned at the second flexible electrode 436 during the second frame FT2, the white gray scale or the black gray scale displayed during the second frame FT2 is different from what is displayed during the first frame FT1.

As described above, the shutter 440 moves to the first flexible electrode 435 or the second flexible electrode 436 according to the voltage provided through the gate line GL, the data voltage provided through the data line DL, the voltage provided through the first signal line SL1, the voltage provided through the second signal line SL2, and/or the voltage provided through the third signal line SL3 to control the transmission of the light. Thus, the pixel may display at least two gray scales.

Figure 9:
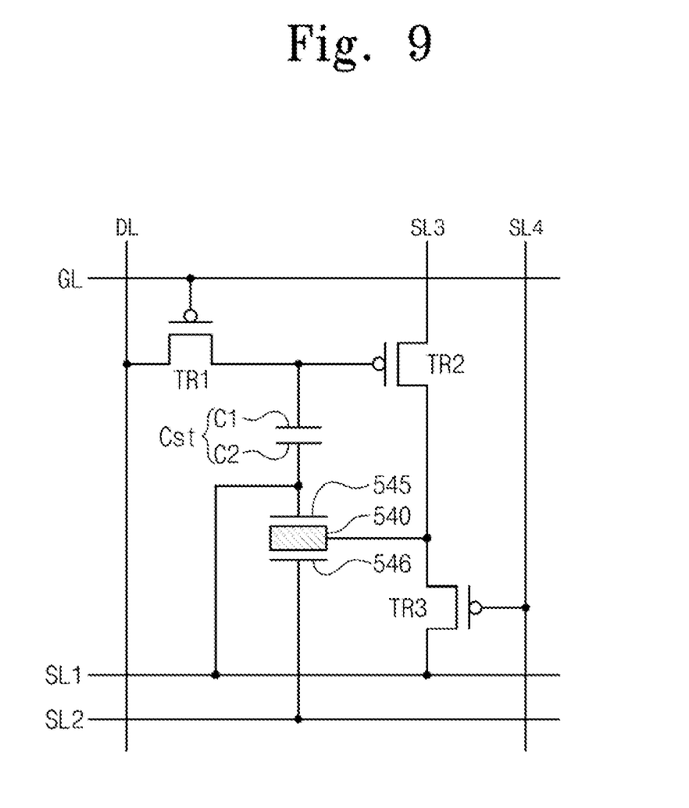
FIG. 9 is a circuit diagram illustrating a pixel illustrated in FIG. 1 according to an embodiment of the present invention.
Figure 10:
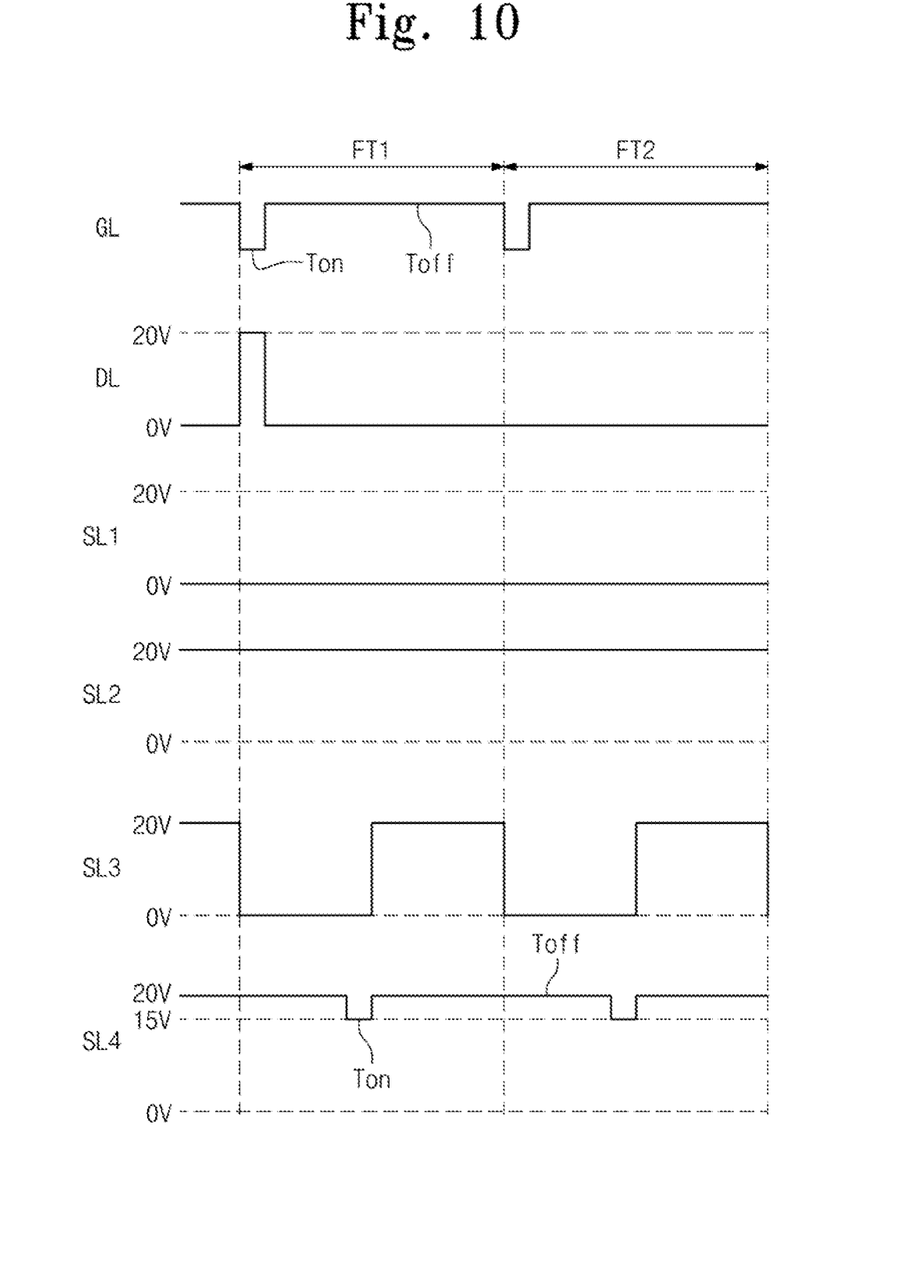
FIG. 10 is a timing diagram illustrating a method of driving the pixel illustrated in FIG. 9.

FIG. 9 is a circuit diagram illustrating a pixel shown in FIG. 1 according to an embodiment of the present invention, and FIG. 10 is a timing diagram illustrating a method of driving the pixel illustrated in FIG. 9.

Referring to FIG. 9, the pixel includes a first switching device TR1, a second switching device TR2, a third switching device TR3, a shutter 540, a first flexible electrode 545, a second flexible electrode 546, and a storage capacitor Cst.

In addition, the pixel further includes a third signal line SL3 connected to the second switching device TR2 and a fourth signal line SL4 connected to the third switching device TR3.

The first switching device TR1 includes a first electrode connected to the gate line GL, a second electrode connected to the data line DL, and a third electrode connected to the second switching device TR2. When the first switching device TR1 is turned on in response to the gate signal applied to the gate line GL, the data voltage applied to the data line is output from the third electrode of the turned-on first switching device TR1 through the second electrode of the turned-on first switching device TR1.

The second switching device TR2 includes a first electrode connected to the third electrode of the first switching device TR1, a second electrode connected to the third signal line SL3, and a third electrode connected to the shutter 540.

The third switching device TR3 includes a first electrode connected to the fourth signal line SL4, a second electrode connected to the third electrode of the second switching device TR2 and the shutter 540, and a third electrode connected to the first signal line SL1. The third switching device TR3 discharges the electric charges on the shutter 540.

The first flexible electrode 545 is connected to the first signal line SL1 to receive the first voltage. The second flexible electrode 546 is connected to the second signal line SL2 to receive the second voltage. The first and second flexible electrodes 545 and 546 face each other with the shutter 540 being interposed therebetween.

The storage capacitor Cst includes a first capacitor electrode C1 extending from the third electrode from the first switching device TR1 and a second capacitor electrode C2 extending from the first signal line SL1 to face the first capacitor electrode C1. The pixel illustrated in FIG. 9 will be described with reference to FIG. 10 on the assumptions that the first voltage is substantially zero volts and that the second voltage is about 20 volts.

Referring to FIG. 10, when a turn-on signal Ton is applied to the first electrode of the first switching device TR1 in the first frame FT1, the data voltage of about 20 volts is applied to the second electrode of the first switching device TR1. The voltage of about 20 volts input through the first switching device TR1 is charged in the storage capacitor Cst. Then, when the voltage input through the third signal line SL3 is changed from a voltage substantially equal to the first voltage (i.e., zero volts) that turns off the second switching device TR2 to a voltage substantially equal to the second voltage (i.e., 20 volts) that turns on the second switching device TR2, a voltage of about 20 volts is applied to the shutter 540 through the second switching device TR2. In this case, since the voltage of about 20 volts is applied to the shutter 540, the shutter 540 moves to the first flexible electrode 545. Thus, the pixel may display a white gray scale or a black gray scale in the first frame FT1.

When the turn-on signal Ton is applied to the first electrode of the first switching device TR1 in the second frame FT2, the data voltage of zero volts is applied to the second electrode of the first switching device TR1. The voltage input through the first switching device TR1 is charged in the storage capacitor Cst. Then, when the voltage input through the fourth signal line SL4 becomes the voltage (i.e., 15 volts) Ton used to turn on the third switching device TR3, zero volts is applied to the shutter 540 through the first signal line SL1. Accordingly, the shutter 540 moves to the second flexible electrode 546.

After that, although the voltage input through the third signal line SL3 changes from a voltage substantially equal to the first voltage (i.e., zero volts) that turns off the second switching device TR2 to a voltage substantially equal to the second voltage (i.e., 20 volts) that turns on the second switching device TR2, the zero volts applied to the shutter 540 may be maintained since the second transistor TR2 is turned off. Accordingly, the shutter 540 moves to the second flexible electrode 546 during the second frame FT2, and thus the pixel may display the white gray scale or the black gray scale during the second frame FT2. Given that the shutter 540 is positioned at the second flexible electrode 546 during the second frame FT2, the white gray scale or the black gray scale displayed during the second frame FT2 is different from that displayed during the first frame FT1.

As described above, the shutter 540 moves to the first flexible electrode 545 or the second flexible electrode 546 according to the voltage provided through the gate line GL, the data voltage provided through the data line DL, the voltage applied through the first signal line SL1, the voltage provided through the second signal line SL2, the voltage provided through the third signal line SL3, and/or the voltage applied through the fourth signal line SL4 to control the transmission of light. Therefore, the pixel may display at least two gray scales.

Although examples of embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. A display apparatus comprising:
   a first substrate including a first plurality of openings through which light is transmitted;
   a second substrate facing the first substrate; and
   a plurality of pixels disposed on at least one of the first substrate or the second substrate, the plurality of pixels including at least a first pixel, the first pixel comprising:
   a first flexible electrode receiving a first voltage;
   a second flexible electrode facing the first flexible electrode, the second flexible electrode receiving a second voltage different from the first voltage;
   a storage capacitor electrically connected to one of the first flexible electrode and the Second flexible electrode; and
   a shutter disposed between the first flexible electrode and the second flexible electrode, the shutter including at least a second plurality of openings, the shutter receiving a third voltage, wherein the shutter moves to the first flexible electrode or the second flexible electrode according to a level of the third voltage to adjust a position of the second plurality of openings relative to the first plurality of openings, thereby controlling transmission of the light.

2. The display apparatus of claim 1, wherein the first pixel further comprises:
   a gate line extending in a first direction;
   a data line extending in a second direction and insulated from the gate line while crossing the gate line; and
   a switching device comprising a first electrode connected to the gate line, a second electrode connected to the data line, and a third electrode electrically connected to the shutter.

3. The display apparatus of claim 2, wherein the shutter moves to the second flexible electrode when the level of the third voltage is equal to a level of the first voltage, and the shutter moves to the first flexible electrode when the level of the third voltage is equal to a level of the second voltage.

4. The display apparatus of claim 2, wherein the first pixel further comprises:
   a first signal line spaced apart from the gate line and extending in the first direction to apply the first voltage to the first flexible electrode; and
   a second signal line spaced apart from the data line, insulated from the gate line and the first signal line, and extending in the second direction to apply the second voltage to the second flexible electrode.

5. The display apparatus of claim 4, wherein the storage capacitor includes a first capacitor electrode electrically connected to the data line and a second capacitor electrode electrically connected to the second signal line and facing the first capacitor electrode.

6. The display apparatus of claim 4, wherein
   the first signal line is electrically connected to the first flexible electrode, and
   the second signal line is electrically connected to the second flexible electrode.

7. The display apparatus of claim 2, wherein the third voltage is provided through the data line.

8. The display apparatus of claim 1, wherein the plurality of pixels is disposed on the second substrate.

9. The display apparatus of claim 1, wherein the first pixel further comprises:
   a pixel electrode; and
   a supporter disposed on the pixel electrode to support the shutter, the supporter electrically connecting the pixel electrode and the shutter.

10. The display apparatus of claim 9, wherein
    the shutter has a double-layer structure including a first semiconductor layer and a first light absorbing layer, and
    the supporter comprises a conductive layer, a second semiconductor layer, and a light absorbing layer, the conductive layer being electrically connected to the pixel electrode, the second semiconductor layer contacting the pixel electrode and the conductive layer, the second semiconductor being connected to the first semiconductor layer, the second light absorbing layer being disposed on the conductive layer and the second semiconductor layer, the second light absorbing layer being connected to the first light absorbing layer.

11. The display apparatus of claim 10, wherein
    the conductive layer comprises aluminum,
    the second semiconductor layer comprises silicon, and
    the second light absorbing layer comprises chromium oxide.

12. The display apparatus of claim 9, wherein
    the shutter has a double-layer structure including a first semiconductor layer and a first conductive layer, and the supporter comprises a second semiconductor layer and a second conductive layer, the second semiconductor layer contacting the pixel electrode, the second semiconductor layer being connected to the first semiconductor layer, the second conductive layer being electrically connected to the pixel electrode, the second conductive layer being spaced apart from the first conductive layer.

13. The display apparatus of claim 12, wherein
the conductive layer comprises aluminum, and
the semiconductor layer comprises silicon.

14. The display apparatus of claim 1, wherein the first pixel further comprises:
- a gate line extending in a first direction;
- a data line extending in a second direction and insulated from the gate line while crossing the gate line;
- a first switching device including a first electrode, a second electrode, and a third electrode, the first electrode being electrically connected to the gate line for receiving a signal to switch on or switch off the first switching device, the second electrode being electrically connected to the data line, the third electrode being spaced apart from the second electrode; and
- a second switching device including a fourth electrode, a fifth electrode, and a sixth electrode, the fourth electrode being electrically connected to the third electrode for receiving a data voltage from the data line to switch on or switch off the second switching device, the fifth electrode receiving the third voltage, the sixth electrode being electrically connected to the shutter.

15. The display apparatus of claim 14, wherein the first pixel further comprises:
- a first signal line spaced apart from the gate line and extending in the first direction, the first signal line applying the first voltage to the first flexible electrode; and
- a second signal line spaced apart from the data line, insulated from the gate line and the first signal line, and extending in the second direction, the second signal line applying the second voltage to the second flexible electrode.

16. The display apparatus of claim 14, wherein the storage capacitor includes a first capacitor electrode and a second capacitor electrode, the first capacitor electrode being electrically connected to the third electrode, the second capacitor electrode being electrically connected to the first signal line and facing the first capacitor electrode.

17. The display apparatus of claim 1, wherein the first pixel further comprises:
- a gate line extending in a first direction;
- a data line extending in a second direction and insulated from the gate line while crossing the gate line;
- a first switching device including a first electrode, a second electrode, and a third electrode, the first electrode being electrically connected to the gate line for receiving a signal to switch on or switch off the first switching device, the second electrode being electrically connected to the data line, the third electrode being spaced apart from the second electrode;
- a second switching device including a fourth electrode, a fifth electrode, and a sixth electrode, the fourth electrode being electrically connected to the third for receiving a data voltage from the data line to switch on or switch off the second switching device, the fifth electrode receiving the third voltage, the sixth electrode being electrically connected to the shutter; and
- a third switching device including a seventh electrode, an eighth electrode, a ninth electrode, the seventh electrode receiving a fourth voltage to switch on or switch off the third switching device, the eighth electrode being electrically connected to the sixth electrode and being electrically connected to the shutter, the ninth electrode receiving the first voltage.

18. The display apparatus of claim 17, wherein the first pixel further comprises:
- a first signal line spaced apart from the gate line and extending in the first direction, the first signal line the first voltage to the first flexible electrode and the ninth electrode; and
- a second signal line insulated from the data line, spaced apart from the gate line and the first signal line, and extending in the first direction, the second signal line applying the second voltage to the second flexible electrode.

19. The display apparatus of claim 18, wherein the storage capacitor includes a first capacitor electrode and a second capacitor electrode, the first capacitor electrode being electrically connected to the third electrode, the second capacitor electrode being electrically connected to the first signal line and the first flexible electrode.

20. The display apparatus of claim 17, wherein the shutter receives the first voltage through the first signal line when the third switching device is switched on.

* * * * *